US011685295B2

(12) United States Patent
Sune et al.

(10) Patent No.: US 11,685,295 B2
(45) Date of Patent: Jun. 27, 2023

(54) SEAT ADJUSTMENT LEVER AND MECHANISM

(71) Applicant: Lear Corporation, Southfield, MI (US)

(72) Inventors: Anurag Sune, Maharashtra (IN); Venkateswarulu Kongathi, Maharashtra (IN); Rajiv Kumar, Maharashtra (IN); Prasanth Bhaskara, Maharashtra (IN); Timothy Rocheleau, Windsor (CA)

(73) Assignee: Lear Corporation, Southfield, MI (US)

( * ) Notice: Subject to any disclaimer, the term of this patent is extended or adjusted under 35 U.S.C. 154(b) by 435 days.

(21) Appl. No.: 16/911,976

(22) Filed: Jun. 25, 2020

(65) Prior Publication Data

US 2021/0402896 A1  Dec. 30, 2021

(51) Int. Cl.
*B60N 2/30* (2006.01)
*B60N 2/23* (2006.01)

(52) U.S. Cl.
CPC ............ *B60N 2/3009* (2013.01); *B60N 2/23* (2013.01); *B60N 2/3088* (2013.01); *B60N 2205/40* (2013.01)

(58) Field of Classification Search
CPC ...... B60N 2/3009; B60N 2/23; B60N 2/3088; B60N 2205/40
USPC .................................................... 296/65.09
See application file for complete search history.

(56) References Cited

U.S. PATENT DOCUMENTS

| 4,887,864 A * | 12/1989 | Ashton | B60N 2/23 297/375 |
|---|---|---|---|
| 5,662,369 A | 9/1997 | Tsuge | |
| 6,026,705 A | 2/2000 | Ficyk et al. | |
| 8,496,294 B2 * | 7/2013 | Holdampf | B60N 2/309 296/65.09 |
| 10,406,946 B2 | 9/2019 | Kreuels et al. | |
| 2004/0084946 A1 * | 5/2004 | Bonk | B60N 2/305 297/378.14 |
| 2006/0170270 A1 * | 8/2006 | Inoue | B60N 2/3009 297/378.12 |
| 2007/0090670 A1 * | 4/2007 | Garland | B60N 2/2352 297/285 |
| 2014/0138999 A1 * | 5/2014 | Stesl | B60N 2/366 297/378.12 |
| 2020/0223327 A1 * | 7/2020 | Aktas | B60N 2/14 |

FOREIGN PATENT DOCUMENTS

| CA | 2796668 A1 * | 5/2013 | ......... B60N 2/01583 |
|---|---|---|---|
| DE | 102015009094 A1 | 1/2017 | |
| FR | 3003817 A1 * | 10/2014 | ............... B60N 2/12 |

(Continued)

*Primary Examiner* — Hilary L Gutman
(74) *Attorney, Agent, or Firm* — Brooks Kushman P.C.

(57) ABSTRACT

A seat adjustment first lever is adapted to be mounted to a first lateral end of a recline mechanism of a seatback. Rotation of the first lever about a pivot axis disengages the recline mechanism. The first lever includes a first lever input portion extending from the pivot axis for manual rotation of the first lever. A second lever input portion extends from the pivot axis and is sized to receive an input cable for actuation of the first lever from a remote location. A lever output portion extends from the pivot axis and is sized to receive an output cable to connect the first lever to a second lever on a second lateral end of the recline mechanism.

20 Claims, 3 Drawing Sheets

(56) References Cited

FOREIGN PATENT DOCUMENTS

| | | | |
|---|---|---|---|
| JP | H0820268 A | 1/1996 | |
| JP | 3577343 B2 | 10/2004 | |
| KR | 1388985 B1 * | 4/2014 | ............... B60N 2/22 |
| KR | 2020021638 A * | 3/2020 | ............ B60N 2/3088 |
| WO | WO-2004043739 A2 * | 5/2004 | ......... B60N 2/01583 |
| WO | WO-2004060713 A1 * | 7/2004 | ......... B60N 2/01583 |
| WO | WO-2006128290 A1 * | 12/2006 | ......... B60N 2/01583 |
| WO | WO-2010051646 A1 * | 5/2010 | ............ B60N 2/2356 |
| WO | WO-2017174538 A1 * | 10/2017 | ............... B60N 2/20 |

* cited by examiner

SEAT ADJUSTMENT LEVER AND MECHANISM

TECHNICAL FIELD

Various embodiments relate to seat adjustment levers and mechanisms for adjusting a recline mechanism of a seat assembly, such as a vehicle seat assembly adjacent to a cargo compartment.

BACKGROUND

The prior art has provided recline mechanisms to adjust vehicle seat assemblies adjacent to cargo compartments, and levers for adjustment of the recline mechanisms.

SUMMARY

According to an embodiment, a seat adjustment first lever is adapted to be mounted to a first lateral end of a recline mechanism of a seatback. Rotation of the first lever about a pivot axis disengages the recline mechanism. The first lever includes a first lever input portion extending from the pivot axis for manual rotation of the first lever. A lever output portion extends from the pivot axis and is sized to receive an output cable to connect the first lever to a second lever on a second lateral end of the recline mechanism.

According to another embodiment, a seat assembly provides a seat adjustment first lever is adapted to be mounted to a first lateral end of a recline mechanism of a seatback. Rotation of the first lever about a pivot axis disengages the recline mechanism. The first lever includes a first lever input portion extending from the pivot axis for manual rotation of the first lever. A lever output portion extends from the pivot axis and is sized to receive an output cable to connect the first lever to a second lever on a second lateral end of the recline mechanism. A strap is attached to a distal end of the first lever input portion for manual rotation of the first lever to rotate the first lever and to disengage the recline mechanism to pivot the seatback.

According to another embodiment, a seat assembly provides a seat adjustment first lever is adapted to be mounted to a first lateral end of a recline mechanism of a seatback. Rotation of the first lever about a pivot axis disengages the recline mechanism. The first lever includes a first lever input portion extending from the pivot axis for manual rotation of the first lever. A second lever input portion extends from the pivot axis and is sized to receive an input cable for actuation of the first lever from a remote location. A lever output portion extends from the pivot axis and is sized to receive an output cable to connect the first lever to a second lever on a second lateral end of the recline mechanism. The input cable is attached to the second lever input portion.

According to a further embodiment, a manual lever is connected to the input cable so that rotation of the manual lever actuates the input cable to rotate the first lever and to disengage the recline mechanism to pivot the seatback.

According to another embodiment, a seat adjustment assembly is provided with a seat adjustment first lever adapted to be mounted to a first lateral end of a recline mechanism of a seatback. Rotation of the first lever about a pivot axis disengages the recline mechanism. The first lever includes a first lever input portion extending from the pivot axis for manual rotation of the first lever. A lever output portion extends from the pivot axis and is sized to receive an output cable to connect the first lever to a second lever on a second lateral end of the recline mechanism. A second lever is adapted to be connected to a second lateral end of the recline mechanism. An output cable is connected to the lever output portion of the first lever and is connected to the second lever so that rotation of the first lever rotates the second lever to coordinate disengagement of the recline mechanism at the first lateral end and the second lateral end.

According to a further embodiment, a first biasing member cooperates with the first lever to bias the first lever toward an engaged position of the recline mechanism.

According to an even further embodiment, a second biasing member cooperates with the second lever to bias the second lever toward the engaged position of the recline mechanism.

According to another embodiment, a seat assembly is provided with a pair of spaced apart seat support brackets. A seatback is pivotally connected to the pair of spaced apart seat support brackets. A recline mechanism is connected to the pair of spaced apart seat support brackets and the seatback. The recline mechanism has an engaged position whereby the seatback is locked relative to the pair of spaced apart seat support brackets, and a disengaged position whereby the seatback is pivotally adjustable relative to the pair of spaced apart seat support brackets. A seat adjustment assembly is provided with a seat adjustment first lever adapted to be mounted to a first lateral end of a recline mechanism of a seatback. Rotation of the first lever about a pivot axis disengages the recline mechanism. The first lever includes a first lever input portion extending from the pivot axis for manual rotation of the first lever. A lever output portion extends from the pivot axis and is sized to receive an output cable to connect the first lever to a second lever on a second lateral end of the recline mechanism. A second lever is adapted to be connected to a second lateral end of the recline mechanism. An output cable is connected to the lever output portion of the first lever and is connected to the second lever so that rotation of the first lever rotates the second lever to coordinate disengagement of the recline mechanism at the first lateral end and the second lateral end. The first lever is mounted to a first lateral end of the recline mechanism and the second lever is mounted to a second lateral end of the recline mechanism.

According to another embodiment, a first seat assembly and a second seat assembly, are each provided with a pair of spaced apart seat support brackets. A seatback is pivotally connected to each pair of spaced apart seat support brackets. A recline mechanism is connected to each pair of spaced apart seat support brackets and the seatback. Each recline mechanism has an engaged position whereby the seatback is locked relative to the pair of spaced apart seat support brackets, and a disengaged position whereby the seatback is pivotally adjustable relative to the pair of spaced apart seat support brackets. Each seat adjustment assembly is provided with a seat adjustment first lever adapted to be mounted to a first lateral end of a recline mechanism of a seatback. Rotation of the first lever about a pivot axis disengages the recline mechanism. Each first lever includes a first lever input portion extending from the pivot axis for manual rotation of the first lever. A lever output portion extends from the pivot axis and is sized to receive an output cable to connect the first lever to a second lever on a second lateral end of the recline mechanism. A second lever is adapted to be connected to a second lateral end of the recline mechanism. An output cable is connected to the lever output portion of the first lever and is connected to the second lever so that rotation of the first lever rotates the second lever to coordinate disengagement of the recline mechanism at the first lateral end and the second lateral end. Each first lever is mounted to a first lateral end of the recline mechanism and the second lever is mounted to a second lateral end of the recline mechanism. The first seat assembly and the second seat assembly are aligned adjacent each other as a common seating row. The first lever of each seat assembly is oriented laterally outboard and the second lever of each seat assembly is oriented laterally inboard and adjacent the other second lever.

According to another embodiment, a seat adjustment assembly is provided with a first lever adapted to be mounted to a first lateral end of a recline mechanism of a seatback. Rotation of the first lever about a pivot axis disengages the recline mechanism. A first lever input portion extends from the pivot axis of the first lever for manual rotation of the first lever. An output cable is connected to a lever output portion of the first lever and connected to a second lever on a second lateral end of the recline mechanism.

According to a further embodiment, a strap is attached to a distal end of the first lever input portion for manual rotation of the first lever to rotate the first lever and to disengage the recline mechanism to pivot the seatback.

According to another further embodiment, an input cable is connected to a second lever input portion of the first lever for actuation of the first lever from a remote location. A manual lever is connected to the input cable so that rotation of the manual lever actuates the input cable to rotate the first lever and to disengage the recline mechanism to pivot the seatback.

According to another further embodiment, a second lever is adapted to be connected to a second lateral end of the recline mechanism. An output cable is connected to the lever output portion of the first lever and is connected to the second lever so that rotation of the first lever rotates the second lever to coordinate disengagement of the recline mechanism at the first lateral end and the second lateral end.

According to another further embodiment, a first biasing member cooperates with the first lever to bias the first lever toward an engaged position of the recline mechanism.

According to an even further embodiment, a second biasing member cooperates with the second lever to bias the second lever toward the engaged position of the recline mechanism.

According to another embodiment, a seat assembly is provided with a pair of spaced apart seat support brackets. A seatback is pivotally connected to the pair of spaced apart seat support brackets. A recline mechanism is connected to the pair of spaced apart seat support brackets and the seatback. The recline mechanism has an engaged position whereby the seatback is locked relative to the pair of spaced apart seat support brackets, and a disengaged position whereby the seatback is pivotally adjustable relative to the pair of spaced apart seat support brackets. A seat adjustment assembly is provided with a first lever adapted to be mounted to a first lateral end of a recline mechanism of a seatback. Rotation of the first lever about a pivot axis disengages the recline mechanism. A first lever input portion extends from the pivot axis of the first lever for manual rotation of the first lever. An output cable is connected to an output lever portion of the first lever and connected to a second lever on a second lateral end of the recline mechanism. A second lever is adapted to be connected to a second lateral end of the recline mechanism. An output cable is connected to the lever output portion of the first lever and connected to the second lever so that rotation of the first lever rotates the second lever to coordinate disengagement of the recline mechanism at the first lateral end and the second lateral end. The first lever is mounted to a first lateral end of the recline mechanism and the second lever is mounted to a second lateral end of the recline mechanism.

According to another embodiment, a seating arrangement is provided with a first seat assembly and a second seat assembly, each provided with a pair of spaced apart seat support brackets. A seatback is pivotally connected to each pair of spaced apart seat support brackets. A recline mechanism is connected to each pair of spaced apart seat support brackets and the seatback. Each recline mechanism has an engaged position whereby the seatback is locked relative to the pair of spaced apart seat support brackets, and a disengaged position whereby the seatback is pivotally adjustable relative to the pair of spaced apart seat support brackets. A seat adjustment assembly is provided with a first lever adapted to be mounted to a first lateral end of a recline mechanism of a seatback. Rotation of the first lever about a pivot axis disengages the recline mechanism. A first lever input portion extends from the pivot axis of the first lever for manual rotation of the first lever. An output cable is connected to a lever output portion of the first lever and connected to a second lever on a second lateral end of the recline mechanism. A second lever is adapted to be connected to a second lateral end of the recline mechanism. An output cable is connected to the lever output portion of the first lever and connected to the second lever so that rotation of the first lever rotates the second lever to coordinate disengagement of the recline mechanism at the first lateral end and the second lateral end. The first lever is mounted to a first lateral end of the recline mechanism and the second lever is mounted to a second lateral end of the recline mechanism. The first seat assembly and the second seat assembly are each aligned adjacent each other as a common seating row. The first lever of each seat assembly is oriented laterally outboard and the second lever of each seat assembly is oriented laterally inboard and adjacent the other second lever.

According to another embodiment, a seat assembly is provided with a pair of spaced apart seat support brackets. A seatback is pivotally connected to the pair of spaced apart seat support brackets. A recline mechanism is connected to the pair of spaced apart seat support brackets and the seatback. The recline mechanism has an engaged position whereby the seatback is locked relative to the pair of spaced apart seat support brackets, and a disengaged position whereby the seatback is pivotally adjustable relative to the pair of spaced apart seat support brackets. A first lever is mounted to a first lateral end of a recline mechanism of a seatback. Rotation of the first lever about a pivot axis disengages the recline mechanism. A first lever input portion extends from the pivot axis of the first lever for manual rotation of the first lever. A first biasing member cooperates with the first lever to bias the first lever toward the engaged position of the recline mechanism. A strap is attached to a distal end of the first lever input portion for manual rotation of the first lever to rotate the first lever and to disengage the recline mechanism to pivot the seatback. A second lever is connected to a second lateral end of the recline mechanism. A second biasing member cooperates with the second lever to bias the second lever toward the engaged position of the recline mechanism. An output cable is connected to a lever output portion of the first lever and connected to the second lever so that rotation of the first lever rotates the second lever to coordinate disengagement of the recline mechanism at the first lateral end and the second lateral end.

According to another embodiment, a seating arrangement is provided with a first seat assembly and a second seat assembly, each seat assembly is provided with a pair of spaced apart seat support brackets. A seatback is pivotally connected to each pair of spaced apart seat support brackets. A recline mechanism is connected to each pair of spaced apart seat support brackets and the seatback. Each recline mechanism has an engaged position whereby the seatback is locked relative to the pair of spaced apart seat support brackets, and a disengaged position whereby the seatback is pivotally adjustable relative to the pair of spaced apart seat support brackets. A first lever is mounted to a first lateral end of a recline mechanism of a seatback. Rotation of the first lever about a pivot axis disengages the recline mechanism. A first lever input portion extends from the pivot axis of the first lever for manual rotation of the first lever. A first biasing member cooperates with the first lever to bias the first lever toward the engaged position of the recline mechanism. A strap is attached to a distal end of the first lever input portion for manual rotation of the first lever to rotate the first lever and to disengage the recline mechanism to pivot the seatback. A second lever is connected to a second lateral end of the recline mechanism. A second biasing member cooperates with the second lever to bias the second lever toward the engaged position of the recline mechanism. An output cable is connected to an output lever portion of the first lever and connected to the second lever so that rotation of the first lever rotates the second lever to coordinate disengagement of the recline mechanism at the first lateral end and the second lateral end. The first seat assembly and the second seat assembly are aligned adjacent each other as a common seating row. The first lever of each seat assembly is oriented laterally outboard and the second lever of each seat assembly is oriented laterally inboard and adjacent the other second lever.

According to another embodiment, a vehicle assembly is provided with a seating arrangement with a first seat assembly and a second seat assembly, each seat assembly is provided with a pair of spaced apart seat support brackets. A seatback is pivotally connected to each pair of spaced apart seat support brackets. A recline mechanism is connected to each pair of spaced apart seat support brackets and the seatback. Each recline mechanism has an engaged position whereby the seatback is locked relative to the pair of spaced apart seat support brackets, and a disengaged position whereby the seatback is pivotally adjustable relative to the pair of spaced apart seat support brackets. A first lever is mounted to a first lateral end of a recline mechanism of a seatback. Rotation of the first lever about a pivot axis disengages the recline mechanism. A first lever input portion extends from the pivot axis of the first lever for manual rotation of the first lever. A first biasing member cooperates with the first lever to bias the first lever toward the engaged position of the recline mechanism. A strap is attached to a distal end of the first lever input portion for manual rotation of the first lever to rotate the first lever and to disengage the recline mechanism to pivot the seatback. An input cable is connected to a second lever input portion of the first lever for actuation of the first lever from a remote location. A manual lever is connected to the input cable such that rotation of the manual lever actuates the input cable to rotate the first lever and to disengage the recline mechanism to pivot the seatback. A second lever is connected to a second lateral end of the recline mechanism. A second biasing member cooperates with the second lever to bias the second lever toward the engaged position of the recline mechanism. An output cable is connected to a lever output portion of the first lever and is connected to the second lever so that rotation of the first lever rotates the second lever to coordinate disengagement of the recline mechanism at the first lateral end and the second lateral end. The first seat assembly and the second seat assembly are aligned adjacent each other as a common seating row. The first lever of each seat assembly is oriented laterally outboard and the second lever of each seat assembly is oriented laterally inboard and adjacent the other second lever. The seating arrangement is oriented in a seating row adjacent to a cargo compartment. The manual lever is oriented in the cargo compartment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
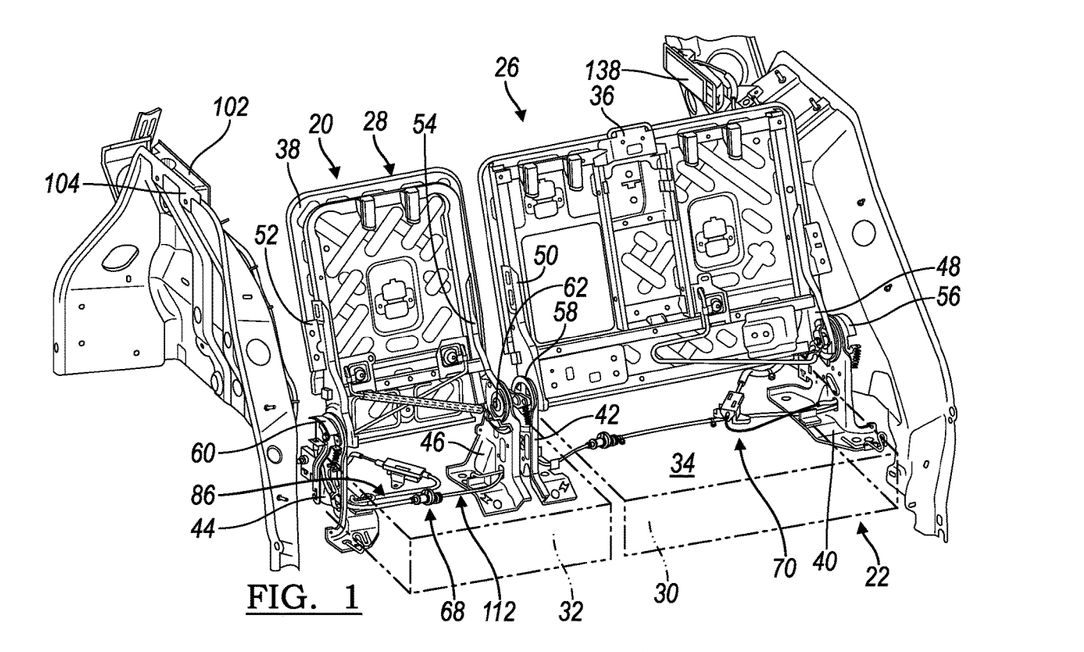
FIG. 1 is a front perspective view of a vehicle seating arrangement of seat assemblies, within a passenger compartment of a vehicle, illustrated partially disassembled.
Figure 2:
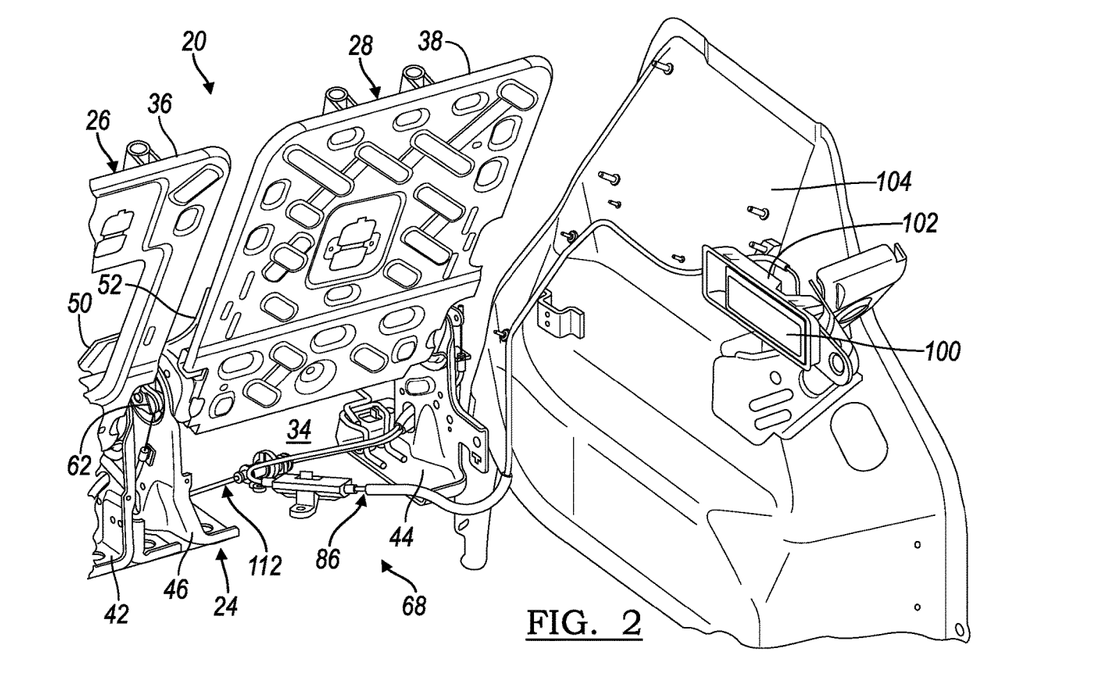
FIG. 2 is a rear perspective view of the vehicle seating arrangement of FIG. 1 and a cargo compartment of the vehicle, illustrated partially disassembled.

FIGS. 1 and 2 illustrate a seating arrangement 20 for a passenger vehicle, including a passenger compartment 22 and a cargo compartment 24. The seating arrangement 20 and the vehicle compartments 22 and 24 are illustrated partially disassembled, with various trim features removed to reveal underlying functional components of the seating arrangement 20. The seating arrangement 20 is provided between the passenger compartment 22 and the cargo compartment 24. The seating arrangement 20 may be a rear seating row of a multiple row vehicle. Alternatively, the seating arrangement 20 may be the only seating row of a single row vehicle assembly.

The seating arrangement 20 includes multiple seat assemblies, such as a primary seat assembly 26 and a secondary seat assembly 28. Since the seating row is separated into two seat assemblies 26, 28 the seat assemblies are often referred to by a percentage of size of the seat assembly 26, 28 relative to the entire seating row 20. Accordingly, the primary seat assembly 26 is often referred to as a sixty percent or 60P seat assembly 26. Likewise, the secondary seat assembly 28 is often referred to as a forty percent or 40P seat assembly 28.

Each seat assembly 26, 28 includes a seat bottom or seat cushion 30, 32 supported upon a vehicle floor 34. The seat cushions 30, 32 are illustrated schematically in FIG. 1. Each seat assembly 26, 28 also includes a seatback 36, 38. The seatbacks 36, 38 are pivotal relative to the seat cushions 30, 32 to permit a user to fold the seatbacks 36, 38 for access between the passenger compartment 22 and the cargo compartment 24. According to an example, the seatbacks 36, 38 may be folded to extend the cargo compartment 24 into the passenger compartment upon a load surface of the seatbacks 36, 38.

Each seat assembly 26, 28 includes a pair of spaced apart seat support brackets 40, 42, 44, 46 that are mounted to the vehicle floor 34. Each seat assembly 26, 28 also includes a pair of pivot brackets 48, 50, 52, 54, each pivotally connected to one of the seat support brackets 40, 42, 44, 46. The primary seatback 36 is attached to one pair of pivot brackets 48, 50 and is pivotally supported by one pair of seat support brackets 40, 42. The secondary seatback 38 is attached to the other pair of pivot brackets 52, 54 and is pivotally supported by the other pair of seat support brackets 44, 46.

A recline mechanism 56, 58, 60, 62 is provided at each pivotal connection of the pivot brackets 48, 50, 52, 54 to the seat support brackets 40, 42, 44, 46. The internal components of the recline mechanisms 56, 58, 60, 62 are conventionally known in the art, and are not illustrated. The recline mechanisms 56, 58, 60, 62 operate to latch the seatbacks 36, 38 at an engaged position, which may be upright, to prevent rotation of the seatbacks 36, 38. A rotary input to the recline mechanisms 56, 58, 60, 62 disengages the recline mechanisms 56, 58, 60, 62 to permit rotation of the seatbacks 36, 38.

Figure 3:
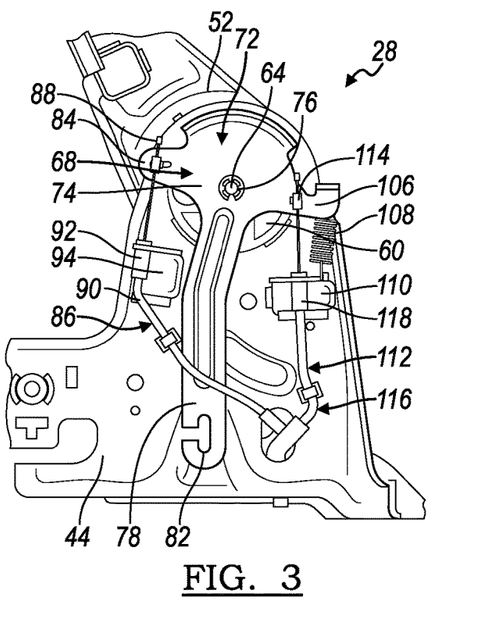
FIG. 3 is a left side elevation view of a portion of one of the seat assemblies of the vehicle seating arrangement of FIG. 1, illustrating an adjustment mechanism.
Figure 4:
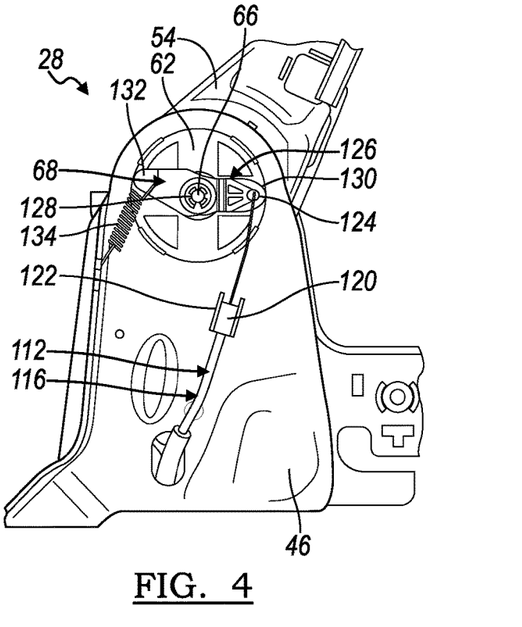
FIG. 4 is a right side elevation view of a portion of the seat assembly of the vehicle seating arrangement of FIG. 1, illustrating the adjustment mechanism.
Figure 5:
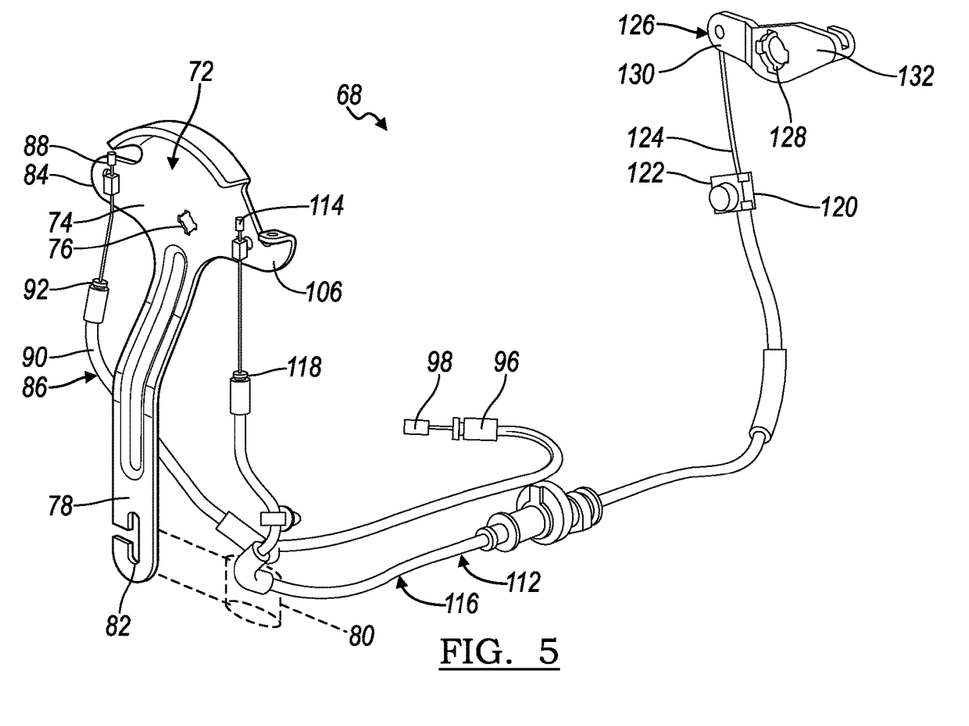
FIG. 5 is a front perspective view of input components of the adjustment mechanism of FIGS. 3 and 4.

Referring now to FIGS. 3 and 4, the seat support brackets 44, 46 of the secondary seat assembly 28 are illustrated. Each of the recline mechanisms 60, 62 includes an outboard input shaft 64, and an inboard plastic spindle 66 to receive a rotary input to release the recline mechanisms 60, 62. Referring now to FIGS. 3-5, the secondary seat assembly 28 includes a seat adjustment assembly 68 for actuating the recline mechanisms 60, 62 to the disengaged position. The seat adjustment assembly 68 is illustrated disassembled from the seat assembly 28 in FIG. 5. Referring again to FIGS. 1 and 2, the primary seat assembly 26 also includes a seat adjustment assembly 70 for disengaging the recline mechanisms 56, 58.

Figure 6:
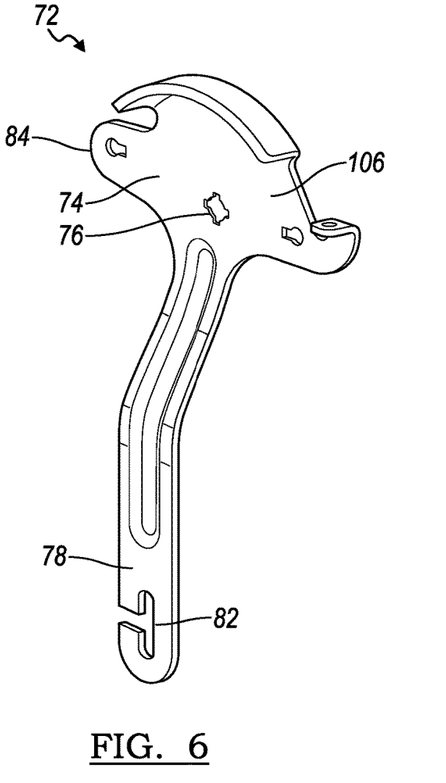
FIG. 6 is a left side perspective view of a lever of the adjustment mechanism of FIGS. 3-5.

FIGS. 3 and 5 illustrate that the seat adjustment assembly 68 includes a first lever 72. The first lever 72 is also illustrated disassembled from the seat adjustment assembly 68 in FIG. 6. The first lever 72 includes a body 74, which may be formed from a structural material, such as a steel alloy. The first lever 72 includes a splined aperture 76 formed through the body 74 that is sized to receive the input shaft 64 at the lateral end of the recline mechanism 60. The input shaft 64 provides a pivot axis for the first lever 72. Counterclockwise rotation of the first lever 72 in FIG. 3 rotates the input shaft 64 counterclockwise and actuates the recline mechanism 60 to unlatch to the disengaged position.

The first lever 72 includes a first lever input portion 78 extending away from the input shaft 64 to provide leverage to an input force. A strap 80 is connected to a slot 82 in a distal end of the first lever input portion 78. The strap 80 extends out of a trim cover on the seat assembly 28 for manual grasping and actuation of the strap 80. Pulling of the strap 80 to the right in FIG. 5, which is in a forward direction of the vehicle, rotates the first lever 72 in the counterclockwise direction of FIGS. 3 and 5, thereby disengaging the recline mechanism 60.

In FIG. 3, the first lever 72 includes a second lever input portion 84, also extending from the pivot aperture 76. According to an embodiment, a cargo input cable 86 is provided with a first end 88 connected to the second lever input portion 84. The cargo input cable 86 is a sheathed cable, often referred to as a Bowden cable. The cargo input cable 86 includes a sheath 90 with a first end 92 mounted to a bracket 94 affixed to the side support bracket 44. Referring to FIG. 5, the cargo cable 86 extends a length for actuation from a remote location. The cargo input cable 86 includes a second end 96 extending through a second end 98 of the sheath 90. The remote location is in another row or compartment of the vehicle.

Referring again to FIG. 2, the cargo input cable 86 extends into the cargo compartment 24 of the vehicle for actuation of the recline mechanisms 60, 62 from the remote location of the cargo compartment 24. A manual release lever 100 is pivotally connected to a bracket 102 on a sidewall 104 in the cargo compartment 24. The manual release lever 100 is oriented adjacent a rear opening of the vehicle for lowering of the seatback 38 from a rear of the vehicle. The second end 96 of the cargo input cable 86 is attached to the manual release lever 100 and the second end 98 of the sheath 90 is affixed to the bracket 102 so that pivoting of the manual release lever 100 translates the cargo input cable 86 within the sheath 90.

Referring again to FIGS. 3 and 5, the first lever 72 includes a third lever portion 106 also extending from pivot aperture 76 and operates as a lever output portion 106. The third lever portion 106 extends diametrically opposed from the second lever portion 84. A biasing member, such as an extension spring 108, is connected to the third lever portion 106 and a bracket 110 on the side support bracket 44. The extension spring 108 biases the first lever 72 in a clockwise rotational direction in FIG. 3 to engage the recline mechanism 60 in absence of a manual force on the strap 80 or the cargo release lever 100.

With reference now to FIGS. 3-5, the seat adjustment assembly 70 includes a second cable 112 to act as an output cable 112 for coordinating both recline mechanisms 60, 62. The output cable 112 includes a first end 114 connected to the third lever portion 106 of the first lever 72. The output cable 112 is a sheathed cable, with the first end 114 extending from a sheath 116 at a first end 118 of the sheath 116. The first end 118 of the sheath 116 is attached to the bracket 110 on the side support bracket 44. The output cable 112 extends from the outboard side support bracket 44 to the inboard side support bracket 46.

Figure 7:
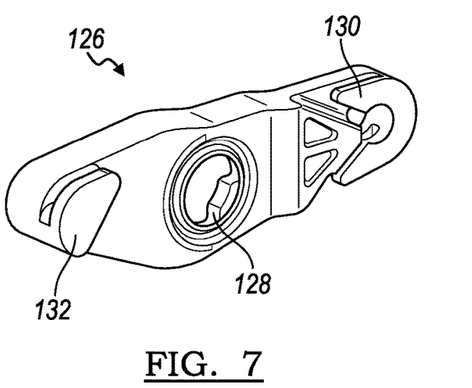
FIG. 7 is a right side perspective view of a second lever of the adjustment mechanism of FIG. 3-5.

The sheath 116 includes a second end 120 connected to a bracket 122 on the inboard side support bracket 46. The output cable 112 also includes a second end 124 connected to a second lever 126. The second lever 126 is illustrated in FIGS. 4, 5 and 7. The second lever 126 may be formed from a suitable polymeric material. The second lever 126 has a body with a splined aperture 128 formed therethrough. The splined aperture 128 of the second lever 126 is mounted on the plastic spindle 66 of the recline mechanism 62. The second lever 126 includes a first lever input portion 130 extending from the plastic spindle 66 and connected to the second end 124 of the output cable 112.

Referring again to FIGS. 3 and 5, counterclockwise rotation of the first lever 72, translates the output cable 112, thereby rotating the second lever 126 clockwise in FIG. 4.

The clockwise rotation of the second lever 126 coordinates the inboard recline mechanism 62 with the outboard recline mechanism 60 so that both recline mechanisms 60, 62 at both lateral ends of the seat assembly 28 are disengaged concurrently.

FIGS. 4, 5 and 7 illustrate that the second lever 126 has a second lever portion 132 extending from the splined aperture 128 diametrically opposed from the first lever input portion 130. With reference now to FIG. 4, an extension spring 134 is connected to the second lever portion 132 of the second lever 126 and to the side support bracket 46. The extension spring 134 biases the second lever 126 to the engaged position. When a force is released from the output cable 112, the extension spring 134 rotates the second lever 126 counterclockwise in FIG. 5 to reengage the recline mechanism 62.

Due to the coordination of the recline mechanisms 60, 62, both recline mechanisms 60, 62 can be actuated by the strap 80 (FIG. 5) or the cargo release lever 100 (FIG. 2). The seat adjustment assembly 68 minimizes the cable design complexity with two cables 86, 112 for actuation and coordination of the recline mechanisms 60, 62. The seat adjustment assembly 68 also removes any additional components extending laterally between the recline mechanisms 60, 62 within the seatback 38.

Figure 8:
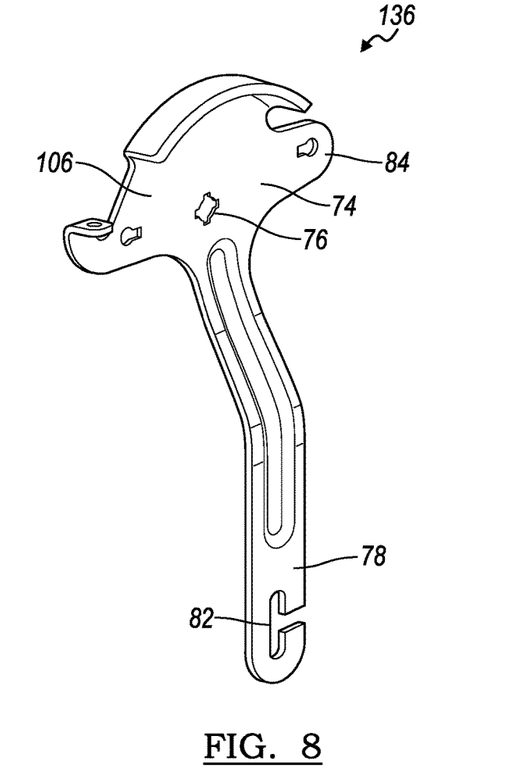
FIG. 8 is a right side perspective view of a lever of the other adjustment mechanism of the vehicle seating arrangement of FIG. 1.
Figure 9:
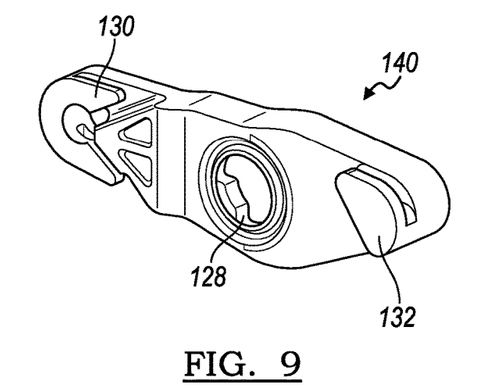
FIG. 9 is a left side perspective view of a second lever of the other adjustment mechanism of the vehicle seating arrangement of FIG. 1.

Referring again to FIG. 1, the seat adjustment assembly 70 of the primary seat assembly 26 is a mirror image of the seat adjustment assembly 68 of the secondary seat assembly 28. The seat adjustment assembly 70 includes a first lever 136, which is illustrated in FIG. 8. The first lever 136 is mounted to the recline mechanism 56 on the laterally outboard side support bracket 40. The first lever 136 is actuated by a strap (not shown) accessible in the seating row 20. The first lever 136 is also actuated by a second cargo release lever 138 (FIG. 1). Rotation of the first lever 136 disengages recline mechanism 56, and rotates a second lever 140 illustrated in FIG. 9. Rotation of the second lever 140 disengages the recline mechanism 58 on the inboard side seat support bracket 42.

According to another embodiment, adjustment of the seat assemblies 26, 28 from the cargo compartment 24 may be optional whereby the manual cargo release levers 100, 138 are omitted. Likewise, without adjustment of the seat assemblies 26, 28 from the cargo compartment, the input cables 86 are also omitted. With adjustment from the cargo compartment 24, the first levers 136 may remain the same, however, without a connection to the input cables 86.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat adjustment assembly comprising:
   a seat adjustment first lever adapted to be mounted to a first lateral end of a recline mechanism of a seatback, whereby rotation of the first lever about a pivot axis disengages the recline mechanism, the first lever comprising:
   a first lever input portion extending from the pivot axis for manual rotation of the first lever,
   a lever output portion extending from the pivot axis and sized to receive an output cable to connect the first lever to a second lever on a second lateral end of the recline mechanism, and
   a second lever input portion extending from the pivot axis and sized to receive an input cable for actuation of the first lever from a remote location;
   the input cable attached to the second lever input portion and extending to a remote location spaced apart from the seatback; and
   a manual lever oriented in the remote location and connected to the input cable so that rotation of the manual lever actuates the input cable to rotate the first lever and to disengage the recline mechanism to pivot the seatback.

2. The seat adjustment assembly of claim 1, further comprising a strap attached to a distal end of the first lever input portion for manual rotation of the first lever to rotate the first lever and to disengage the recline mechanism to pivot the seatback.

3. The seat adjustment assembly of claim 2 wherein a slot is formed in the distal end of the first lever input portion, and the slot is sized to receive the strap.

4. The seat adjustment assembly of claim 1, further comprising:
   the second lever adapted to be connected to a second lateral end of the recline mechanism; and
   the output cable connected to the first lever output portion of the first lever and connected to the second lever so that rotation of the first lever rotates the second lever to coordinate disengagement of the recline mechanism at the first lateral end and the second lateral end.

5. The seat adjustment assembly of claim 4 further comprising a first biasing member cooperating with the first lever to bias the first lever toward an engaged position of the recline mechanism.

6. The seat adjustment assembly of claim 5 further comprising a second biasing member cooperating with the second lever to bias the second lever toward the engaged position of the recline mechanism.

7. A seat assembly comprising:
   a pair of spaced apart seat support brackets;
   a seatback pivotally connected to the pair of spaced apart seat support brackets;
   a recline mechanism connected to the pair of spaced apart seat support brackets and the seatback, the recline mechanism having an engaged position whereby the seatback is locked relative to the pair of spaced apart seat support brackets, and a disengaged position whereby the seatback is pivotally adjustable relative to the pair of spaced apart seat support brackets; and
   the seat adjustment assembly according to claim 4, wherein the first lever is mounted to a first lateral end of the recline mechanism and the second lever is mounted to a second lateral end of the recline mechanism.

8. A seating arrangement comprising a first seat assembly and a second seat assembly, each according to claim 7, aligned adjacent each other as a common seating row, wherein the first lever of each seat assembly is oriented laterally outboard and the second lever of each seat assembly is oriented laterally inboard and adjacent the other second lever.

9. A vehicle assembly comprising a seating arrangement with a seat assembly oriented in a seating row, the seat assembly comprising the seat arrangement of claim 1 wherein the remote location is oriented in another row or compartment of the vehicle assembly.

10. A vehicle assembly comprising a seating arrangement with a seat assembly oriented in a seating row, and a rear opening of the vehicle assembly, the seat assembly comprising the seat adjustment assembly of claim 1 wherein the remote location is oriented adjacent the rear opening.

11. A seat adjustment assembly comprising:
a first lever adapted to be mounted to a first lateral end of a recline mechanism of a seatback, whereby rotation of the first lever about a pivot axis disengages the recline mechanism, a first lever input portion extending from the pivot axis of the first lever for manual rotation of the first lever;
an output cable connected to a lever output portion of the first lever and connected to a second lever on a second lateral end of the recline mechanism;
an input cable connected to a second lever input portion of the first lever for actuation of the first lever from a remote location spaced apart from the seatback; and
a manual lever oriented in the remote location and connected to the input cable so that rotation of the manual lever actuates the input cable to rotate the first lever and to disengage the recline mechanism to pivot the seatback.

12. The seat adjustment assembly of claim 11 further comprising a strap attached to a distal end of the first lever input portion for manual rotation of the first lever to rotate the first lever and to disengage the recline mechanism to pivot the seatback.

13. The seat adjustment assembly of claim 11 further comprising:
the second lever adapted to be connected to a second lateral end of the recline mechanism; and
the output cable connected to the lever output portion of the first lever and connected to the second lever so that rotation of the first lever rotates the second lever to coordinate disengagement of the recline mechanism at the first lateral end and the second lateral end.

14. The seat adjustment assembly of claim 13 further comprising a first biasing member cooperating with the first lever to bias the first lever toward an engaged position of the recline mechanism.

15. The seat adjustment assembly of claim 14 further comprising a second biasing member cooperating with the second lever to bias the second lever toward the engaged position of the recline mechanism.

16. A seat assembly comprising:
a pair of spaced apart seat support brackets;
a seatback pivotally connected to the pair of spaced apart seat support brackets;
a recline mechanism connected to the pair of spaced apart seat support brackets and the seatback, the recline mechanism having an engaged position whereby the seatback is locked relative to the pair of spaced apart seat support brackets, and a disengaged position whereby the seatback is pivotally adjustable relative to the pair of spaced apart seat support brackets; and
the seat adjustment assembly according to claim 13, wherein the first lever is mounted to a first lateral end of the recline mechanism and the second lever is mounted to a second lateral end of the recline mechanism.

17. A seating arrangement comprising a first seat assembly and a second seat assembly, each according to claim 16, aligned adjacent each other as a common seating row, wherein the first lever of each seat assembly is oriented laterally outboard and the second lever of each seat assembly is oriented laterally inboard and adjacent the other second lever.

18. A vehicle assembly comprising a seating arrangement with a seat assembly oriented in a seating row, the seat assembly comprising the seat adjustment assembly of claim 11 wherein the remote location is oriented in another row or compartment of the vehicle assembly.

19. A vehicle assembly comprising a seating arrangement with a seat assembly oriented in a seating row, and a rear opening of the vehicle assembly, the seat assembly comprising the seat adjustment assembly of claim 11 wherein the remote location is oriented adjacent the rear opening.

20. A vehicle assembly comprising a seating arrangement with a first seat assembly and a second seat assembly oriented in a seating row adjacent to a cargo compartment, each of the first seat assembly and the second seat assembly comprising:
a pair of spaced apart seat support brackets;
a seatback pivotally connected to the pair of spaced apart seat support brackets;
a recline mechanism connected to the pair of spaced apart seat support brackets and the seatback, the recline mechanism having an engaged position whereby the seatback is locked relative to the pair of spaced apart seat support brackets, and a disengaged position whereby the seatback is pivotally adjustable relative to the pair of spaced apart seat support brackets;
a first lever mounted to a first lateral end of a recline mechanism of a seatback, whereby rotation of the first lever about a pivot axis disengages the recline mechanism, a first lever input portion extending from the pivot axis of the first lever for manual rotation of the first lever;
a first biasing member cooperating with the first lever to bias the first lever toward the engaged position of the recline mechanism;
a strap attached to a distal end of the first lever input portion for manual rotation of the first lever to rotate the first lever and to disengage the recline mechanism to pivot the seatback;
a second lever connected to a second lateral end of the recline mechanism;
a second biasing member cooperating with the second lever to bias the second lever toward the engaged position of the recline mechanism;
an output cable connected to a lever output portion of the first lever and connected to the second lever so that rotation of the first lever rotates the second lever to coordinate disengagement of the recline mechanism at the first lateral end and the second lateral end;
wherein each of the first seat assembly and the second seat assembly is aligned adjacent each other as a common seating row, wherein the first lever of each seat assembly is oriented laterally outboard and the second lever of each seat assembly is oriented laterally inboard and adjacent the other second lever;
an input cable connected to a second lever input portion of the first lever for actuation of the first lever from a remote location; and
a manual lever connected to the input cable so that rotation of the manual lever actuates the input cable to rotate the first lever and to disengage the recline mechanism to pivot the seatback; and wherein the manual lever is oriented in the cargo compartment.

\* \* \* \* \*

UNITED STATES PATENT AND TRADEMARK OFFICE
CERTIFICATE OF CORRECTION

| | | |
|---|---|---|
| PATENT NO. | : 11,685,295 B2 | |
| APPLICATION NO. | : 16/911976 | |
| DATED | : June 27, 2023 | |
| INVENTOR(S) | : Anurag Sune et al. | |

It is certified that error appears in the above-identified patent and that said Letters Patent is hereby corrected as shown below:

In the Claims

Column 10, Lines 66-67, Claim 9:
After "the seat assembly comprising the seat"
Delete "arrangement" and
Insert -- adjustment assembly --.

Signed and Sealed this
Second Day of April, 2024

*Katherine Kelly Vidal*

Katherine Kelly Vidal
*Director of the United States Patent and Trademark Office*